ROBERT D TALTY
INVENTOR.

Feb. 4, 1969  R. D. TALTY  3,425,847
METHOD OF PREPARING AN EDIBLE TUBULAR COLLAGEN CASING
Filed Sept. 25, 1967

ROBERT D TALTY
*INVENTOR.*

Neal J Mozely
his attorney

United States Patent Office 3,425,847
Patented Feb. 4, 1969

3,425,847
METHOD OF PREPARING AN EDIBLE TUBULAR COLLAGEN CASING
Robert D. Talty, Danville, Ill., assignor to Tee-Pak, Inc., a corporation of Illinois
Continuation-in-part of application Ser. No. 471,645, July 13, 1965. This application Sept. 25, 1967, Ser. No. 670,353
U.S. Cl. 99—176      3 Claims
Int. Cl. A22c 13/00

ABSTRACT OF THE DISCLOSURE

An edible sausage casing having improved strength, bite, stuffing, linking, and cooking characteristics is prepared from hide collagen. Animal hides are limed to swell and dehair the hide, split to produce a collagen containing corium layer and then neutralized in dilute acid. The neutralized hide is ground into fine particles, formed into a slurry and swollen with weak acid to produce an extrudable collagen paste or slurry having a solids content of about 2–6%. Alternatively, the collagen slurry may be prepared by acid or mechanical depilation of the hide, followed by grinding and acid swelling. The slurry is extruded through an annular die, coagulated with ammonium sulfate or sodium sulfate and tanned or hardened in an aluminum sulfate tanning bath. The tanned casing, containing about 1.5–5.0% aluminum is washed, retanned with a dilute solution of glutaraldehyde, rewashed, and plasticized with an aqueous solution of glycerin containing a small amount of a volatile aldehyde. The casing is then dried and reeled and eventually shirred on a commercial shirring machine for delivery to the meat packer in shirred form.

Cross-reference to related application

This application is a continuation-in-part of the application of Robert D. Talty, Ser. No. 471,645, filed July 13, 1965.

Background of the invention

Natural casings are prepared from the intestines of various edible animals, primarily cattle, hogs and sheep. The intestines are removed from the slaughtered animal and are thoroughly cleaned by processes well-known in the art. Natural casings, which have been thoroughly cleaned, are stuffed with various sausage meat compositions and formed into sausage links in preparation for cooking. The sausages which are thus formed are cooked by the consumer and the sausage casings eaten with the cooked sausage. In the preparation of certain smoked or pre-cooked sausages, such as frankfurters and the like, the sausage is cooked or smoked or otherwise processed by the meat packer to render it edible without further treatment by the consumer.

Prior to about 1925, substantially all sausage casings were natural casings prepared from animal intestines. Since that time, there have been developed several types of synthetic sausage casings, primarily of a regenerated cellulose, which are used in the preparation of the major portion of sausages which are made and sold today. Cellulose casings are used in the preparation of large sausages, such as bolognas, salamis and the like, and are removed from the sausage by the consumer at the time of final preparation for eating. Regenerated cellulose casings are also used in the preparation of frankfurter sausages wherein the casing is stuffed with sausage emulsion, linked, smoked, and cooked, and the casing removed from the finished sausage.

Regenerated cellulose casings have not proved satisfactory for the processing of pork sausages inasmuch as cellulose is not edible with the sausage and does not transmit the fat which is released from the sausage during cooking. As a result, there has been some demand for an artificial sausage casing which is edible and which has the properties desired in a casing to be used in the processing of pork sausages.

Over a period of many years, synthetic sausage casings have been prepared from animal collagen. Casings made of collagen have been prepared by processing animal hide to break the collagen into a fibrous structure and extrude the collagen fibers in the form of a doughy mass to produce tubular casings. The casings which have been prepared in this manner have been hardened with formaldehyde and have been used as a removable casing for processing various sausages. These casings have not been edible even though collagen itself is an edible material. More recently, edible sausage casings of collagen have been prepared and sold in commercial quantities. In the manufacture of edible collagen casings, considerable emphasis has been placed on the necessity for using collagen source materials which have not been subjected to a liming treatment. In fact, a number of recent patents describing the production of collagen have indicated that it is absolutely necessary to start with an unlimed collagen source material if an edible casing is to be obtained. While the use of unlimed collagen as a starting material has certain advantages, it has the substantial disadvantage of requiring a more severe mechanical treatment for removal of hair and the epidermal layer from the hides from which the collagen is obtained.

In the co-pending patent application of Robert D. Talty and Mauj A. Cohly, Ser. No. 442,885, filed Mar. 26, 1965, a process is described in which edible collagen casings are prepared from limed hide collagen. In that process, animal collagen is obtained from limed hides which are subsequently subjected to an acid deliming process. In the co-pending patent application of Robert D. Talty, Ser. No. 471,645, filed Sept. 13, 1965, a process is described for the preparation of edible collagen casings from limed hides which may be subjected to an acid deliming process or which may be converted directly into a collagen paste and casings formed without the acid deliming step, provided that the collagen is processed into casing at a sufficiently high speed.

In the preparation of edible collagen casings, hide collagen is converted into a finely divided fibrillar form and extruded in the form of a dilute collagen slurry (e.g., 2–6% collagen content). The extruded collagen is passed into a soduim sulfate and/or ammonium sulfate coagulating bath which dehydrates the collagen slurry and forms a coherent collagen film. At this stage in the processing, however, the salt coagulated collagen film can be handled but will revert to a thin slurry upon further contact with water. It is therefore necessary to harden or tan the extruded collagen film to permit further processing of the film and to provide the film with sufficient strength for use as a sausage casing. A satisfactory tanning process must utilize a tanning agent which is very rapid in tanning action and completely non-toxic in the form in which it is present in the finished casing and must produce a casing of sufficient strength to be stuffed with sausage meat, linked, packaged, and finally cooked. In the preparation of edible collagen casings, one of the most successful methods of hardening or tanning the casing utilizes an alum tanning bath or a bath containing an aluminum salt complex, such as a citrate complex, at a pH suitable for tanning. When casings are tanned or hardened using an aluminum tanning bath the tanned casing in generally quite strong and easy to handle during processing, reeling, shirring, packaging, etc., but often exhibits certain deficiencies in handling at the time of stuffing with sausage emulsion or during cooking. Aluminum tanned casings generally are somewhat stiff and are difficult to link after stuffing. Also, it has been found that aluminum tanned casings often tend to split during frying of sausages stuffed therein and thus are not entirely satisfactory for the preparation of pork sausages.

Statement of objects and features of the invention

It is therefore one object of this invention to provide a new and improved process for the preparation of edible collagen casings from limed or unlimed hides utilizing a novel multi-step tanning process for producing collagen casings having superior stuffing, linking, and cooking properties.

Another object of this invention is to provide a new and improved edible collagen casing prepared from limed or unlimed hides, and tanned or hardened in a multi-step tanning process.

A feature of this invention is the provision of an improved process for preparing edible collagen casings from limed or unlimed hides in which the colagen, if limed, is delimed by an acid treatment or is processed rapidly without deliming the collagen, converted into a suitable slurry for extrusion, acid swollen, extruded into a coagulating bath, and tanned in a multi-step tanning process utilizing first an aluminum tanning bath and finally a glutaraldehyde tanning bath.

Another feature of this invention is the provision of a new and improved edible collagen casing prepared from limed or unlimed hides and tanned in a multi-step tanning process utilizing first an aluminum tanning bath and finally a glutaraldehyde tanning bath, the casing being characterized by improved stuffing linking, and cooking properties.

Other objects and features of this invention will become apparent throughout the specifications and claims as hereinafter related.

Summary of the invention

This invention is based upon the discovery that satisfactory edible colagen casings can be prepared using limed or unlimed hides as the source of collagen, and tanned or hardened in a multi-step process to yield a casing having improved stuffing, linking, and cooking properties. The animal hide is treated to remove the blood quickly and is frozen or salt-cured, or immediately treated with a lime-containing solution to at least partially dehair the hide. The liming step (of the fresh, frozen, or salt-cured hide) is preferably carried out in less than 48 hours. Alternatively, the hide may be treated with dilute non-toxic acid after liming to remove the unreacted calcium from the collagen. The hide is then washed, dehaired, ground at a temperature less than 20° C., and swollen with a non-toxic acid at a pH of about 2.5–3.5. These steps are preferably carried out rapidly, viz., in less than 48 hours, more preferably less than 12 hours.

When the hide is limed, washed, ground, and swollen, a slurry is produced which is extruded through an annular die into a coagulating bath of sodium sulfate or ammonium sulfate, to form a salt-coagulated tubular casing. The casing is then tanned in a multi-step process. The salt-coagulated casing is passed into an aluminum tanning solution, washed, and then passed through a glutaraldehyde tanning solution. The tanned casing is again washed and finally plasticized with a glycerin solution. The tanned, washed, and plasticized casing is then dried, reeled, and eventually shirred and packaged.

The casing which is produced by this process performs better in stuffing, linking and cooking than casing prepared by prior art techniques. A similar improvement in casing properties is obtained when collagen slurries prepared from unlimed hides or enzymatically dehaired hides are extruded, coagulated and tanned in a two-step tanning process as described above.

Brief description of the drawings

The process for the preparation of casings in accordance with this invention will be understood more fully by reference to the following description and the accompanying drawings, in which.

Description of the preferred embodiments

Figure 1:
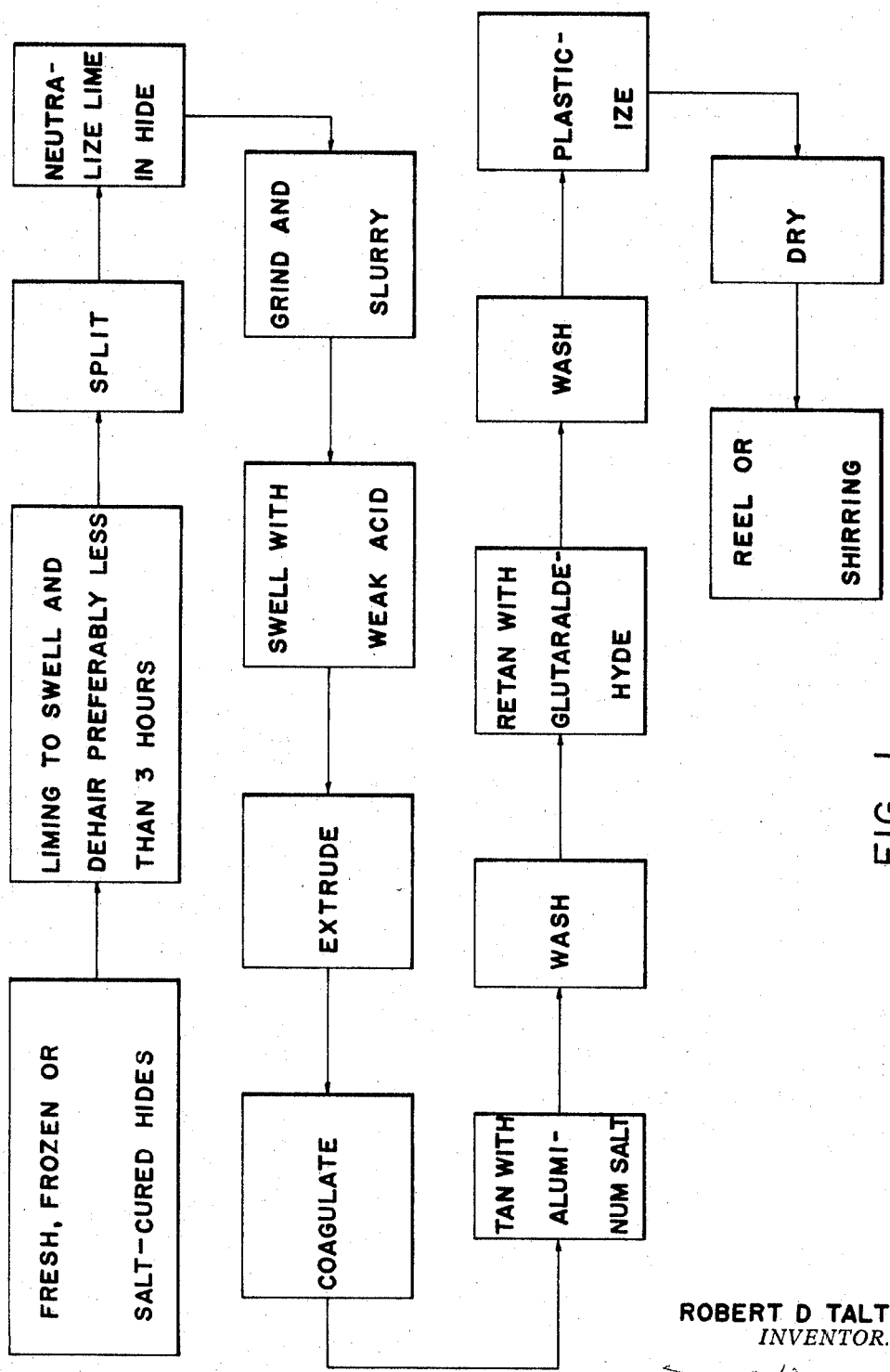
FIG. 1 is a flow diagram illustrating schematically the more important steps in the initial preparation, extrusion, tanning, and processing of edible collagen casings.

In a preferred form of the process, animal hides, preferably steer or cattle hides, are cut into suitable pieces (hide trimmings may also be used) and are treated with a suitable lime solution for removal of hair. The hide may also be limed before cutting into small pieces if desired. The lime solution is preferably a solution containing excess solid lime [$Ca(OH_2)$], sodium sulfhydrate ($NaSH$) and, optionally, dimethylamine sulfate,

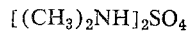

After treatment in such a solution for a period of less than two days (3–12 hours or less is preferred), the hides are removed and washed. After washing, the hides are split or otherwise mechanically abraded to remove the epidermal layer and any remaining hair.

The hides which are thus prepared are washed in a solution containing a non-toxic acid, such as an edible grade lactic acid, to clean the hides further and to neutralize excess lime in the hides. This cleaning and neutralization step is preferably carried out in accordance with the procedure described in the co-pending application of Robert D. Talty and Mauj A. Cohly, Ser. No. 442,885, filed Mar. 26, 1965. The hides are then cut into small pieces and ground into particles of very small size to produce an aqueous slurry having a collagen content in the range from about 2–6%, preferably about 3.5–5%. The collagen is maintained at a temperature less than about 20° C. (preferably less than 10° C.) during the grinding, by repeated addition of ice to the mixture. The collagen slurry which is thus prepared is treated with the dilute solution of weak acid to swell and burst the collagen fibers as previously described. The washing, dehairing, grinding and acid swelling of the collagen are carried out in a relatively short time, generally less than about 48 hours.

The swollen collagen slurry is then extruded through an annular die to produce a thin-walled tubular product suitable for use as sausage casings after tanning and further processing. In order to obtain maximum strength in the product casing, the collagen slurry is preferably extruded through a die having rotating inner and/or outer parts which are well-known in the prior art in the preparation of collagen casings, vide Becker U.S. Patent 2,046,541.

The collagen slurry is extruded through the die into a coagulating bath consisting of concentrated solution of sodium sulfate and/or ammonium sulfate. The thin-walled collagen tube which is formed in the coagulating bath is then passed into a first tanning bath consisting of a solution of an aluminum salt, rendered partially basic or buffered to a pH in excess of 3.0. The casing is next passed through a wash bath and then through a second tanning bath consisting of a dilute solution of glutaraldehyde and then washed and plasticized. The casing which is thus prepared is inflated with air or other gas and passed through a dryer from which the casing is rolled up on reels and subsequently shirred. If desired, it is possible to shirr the casing directly out of the dryer. This has the advantage that it is easier to maintain the casing in an inflated state, but has the disadvantage that the shirring machine is capable of operation at a substantially higher rate of speed than the rate of extrusion of casing in the process. The casing may be shirred on shirring machines of the type used in the shirring of regenerated cellulose casings, such as those shown in U.S. Patents 2,722,714; 2,722,715; 2,723,201; and 3,122,517.

Figure 2:
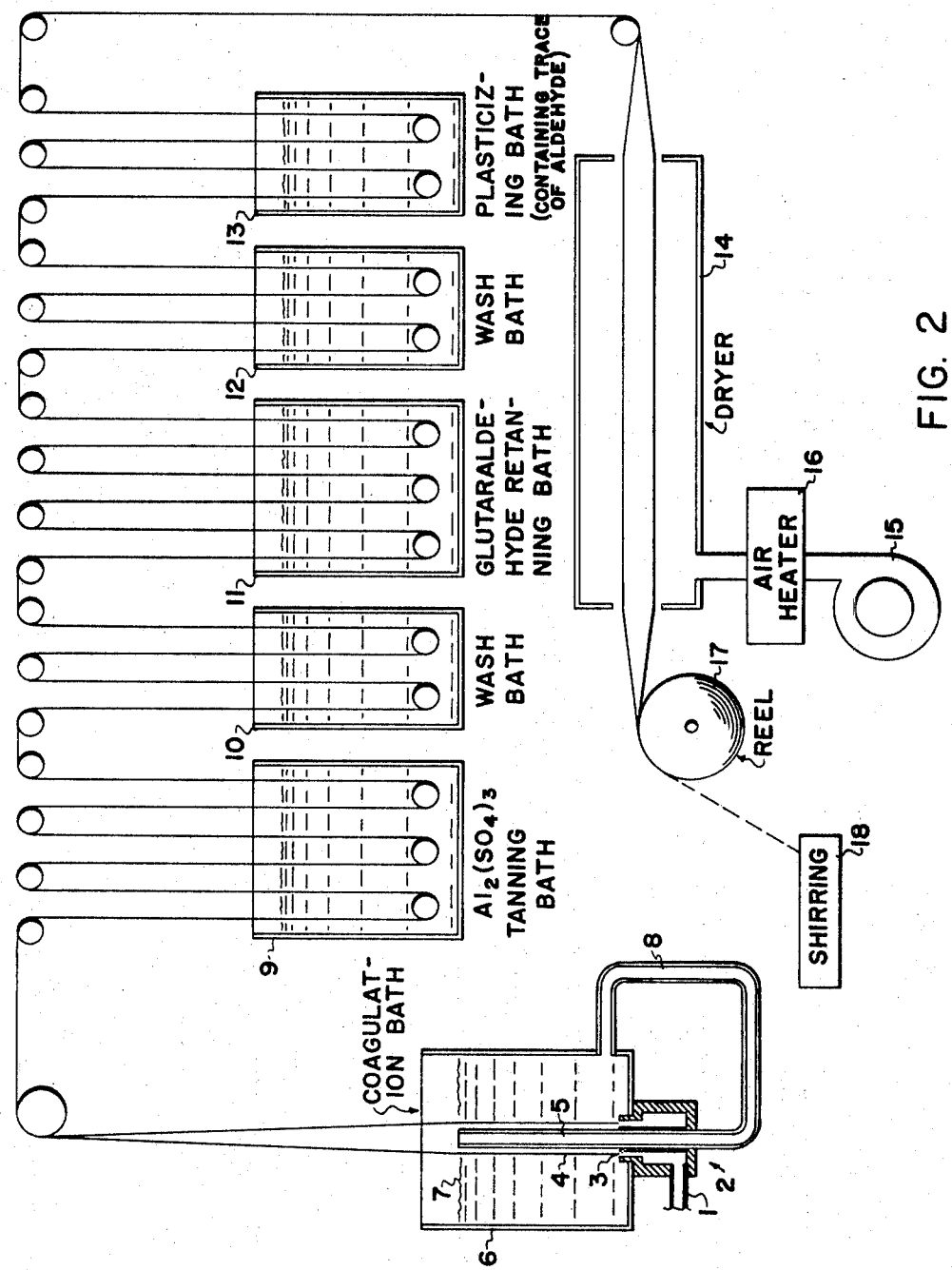
FIG. 2 is a schematic view of the equipment used in the more important steps in the preparation of edible collagen casings.

In FIG. 2 of the drawings, the steps from extrusion through reeling or shirring are illustrated schematically in slightly more detail. The collagen slurry is introduced through inlet conduit 1 into a die 2 having an annular die outlet 3 through which casing 4 is extruded. The die 2 has an inner tube 5 which extends upwardly within the extruded casing to remove coagulating bath from within the extruded casing. Die 2 is preferably a die having a pair of counter rotating members which give the collagen fibers a mixed orientation and thus produce a stronger casing. The die 2 is located at the bottom of container 6 which contains coagulating bath 7 (a concentrated solution of sodium sulfate or ammonium sulfate). Coagulating bath 7 is circulated through conduit 8 from tube 5 for removal of the coagulating bath from inside the extruded casing. Casing 4 which is coagulated in bath 7 passes over a series of rollers and is directed through the first tanning bath 9.

Tanning bath 9 consists of an aqueous solution of an aluminum salt maintained at a pH in excess of 3.0. The solution is preferably of aluminum sulfate or other aluminum salts which have been treated to produce a complex such as a citric acid or sodium citrate complex, and have been partially neutralized, as with sodium carbonate, to render the salt complex partially basic. The tanning bath is preferably at a pH in excess of 3.0.

From the tanning bath 9 the casing passes through a wash bath 10 where unreacted tanning reagent is washed out of the casing. The casing is then passed through a second tanning bath 11 which consists of dilute solution of glutaraldehyde. From the second tanning bath 11 the casing is then passed through a second wash bath 12 which removes unreacted tanning agent. From wash bath 12 the casing passes through plasticizing bath 13 which consists of a solution of glycerin which may contain a trace of a volatile aldehyde such as formaldehyde or pyruvic aldehyde.

From the plasticizing bath 13, the casing passes through dryer 14 where it is inflated and dried with the aid of air circulated by fan or blower 15 through air heater 16. After leaving dryer 14, the casing is preferably rolled up on reel 17 and is eventually shirred on a commercial shirring machine of the type used in the shirring of regenerated cellulose sausage casings as noted above. If desired, the casing may be passed directly to a shirring machine shown diagrammatically as 18.

Figure 4:
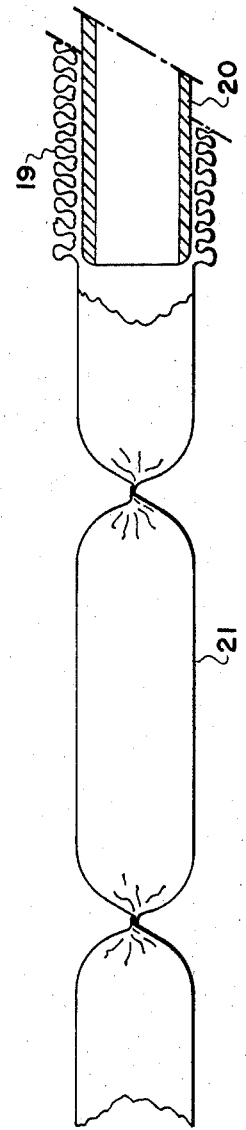
FIG. 4 is a schematic view showing the filling of the casing with sausage meat on an extrusion horn or nozzle and the preparation of sausage links therefrom.

After the casing is shirred into individual short strands, it is packaged and, optionally, may be cured by heating at 60–80° C. in an atmosphere of 20–50% relative humidity for several hours prior to shipment to the meat packer. In FIG. 4, the stuffing of the casing is illustrated. A strand of edible aluminum-glutaraldehyde-tanned collagen casing 19 is placed on a tubular stuffing horn 20 which is connected to a pressurized source of sausage emulsion (not shown). The sausage emulsion is passed through the stuffing horn 20 to the end of casing 19 and the casing is filled with sausage meat and twisted at suitable intervals to provide sausage links 21. The links may be severed from each other and packaged in a suitable overwrap following conventional meat packaging techniques. Alternatively, the links may be packaged in an unsevered string. When the sausage is cooked by the consumer, the casing is found to be quite strong and shrinks with the meat during cooking. The casing may be prestuck, if desired, to permit more rapid release of fat during the cooking of the sausages. Casing which is prepared in this manner has been found to have a shrinkage temperature which is equal to or greater than native collagen and thus does not shrink excessively during cooking. This casing is easy to form into links, stuffs easily without excessive breakage, and cooks well without excessive splitting.

In this process, the use of a glutaraldehyde retanning bath following the aluminum tanning bath has been found to be necessary to produce a casing which links properly and which cooks properly without excessive splitting. When the process described above was carried out with the glutaraldehyde tanning bath omitted, the casing which was produced was of adequate strength for processing, shirring, and packaging, but was found to be extremely difficult to link after stuffing, and the links which were formed were characterized by excessive splitting during cooking. The improvement in casing properties obtained using the combination of aluminum and glutaraldehyde tanning is also obtained when casing is prepared from unlimed hide collagen using the same multi-step tanning process.

The following non-limiting examples are illustrative of the application of this invention to the preparation of a satisfactory edible collagen casing.

Example 1

In this example, the preparation of edible collagen casings from limed animal hides with a combined aluminum-glutaraldehyde tanning is illustrated. Selected cattle hides from carcasses certified fit for human consumption, weighing about 65–75 lbs. each, are the starting material for this process.

As soon as possible after flaying and inspection, the hides are washed in a large volume of circulating cool (10° C.) water to remove adhering blood. After washing, the hides are fleshed fresh, without curing, to remove adhering fatty and muscular debris from the flaying operation.

The washed and fleshed hides are then treated in a liming bath containing 6% wt. of fresh calcium hydroxide and 1.5% wt. of sodium sulfhydrate (the liming bath may contain up to 3% dimethylamine sulfate), as solution and/or slurry contained in about 450% wt. of water at room temperature (15–20° C.), all percentages being calculated on the weight of the hide treated. The treatment is carried out for a period less than about 6 hours, sufficient to remove most of the hair from the hide, and the hides are gently agitated from time to time to insure even penetration of the liming liquor.

After liming, the hides are removed from the liming bath and permitted to drain for a period of ½ hour while suspended. The limed hides are then gently squeezed, as between rubber rollers, to remove excess liming liquor.

The hides which have been thus limed, drained and squeezed, are then cut or split in the plane of the hide into two approximately equal portions by weight. The upper or outer hide surface contains all of the air, hair follicles, sebaceous and sudorific glands. The inner or corium layer consists substantially of collagen. The outer or hair-containing layer or split is discarded as unsuitable for use in the preparation of casing but may be used for formation of leather laminates or coverings.

The corium layer or split is then placed in a tank or vat containing about 4.5 times the hide weight of water at a temperature less than about 15° C. Gentle agitation is used to insure even removal of debris and adhering lime solution and/or slurry. The hides are washed during a period of 20–30 minutes. The washings are removed and the corium splits resuspended in 4.5 times their weight of cool (15° C.) water. Edible grade lactic acid, suitably diluted at a concentration of 2–4 ounces of 44% lactic acid per quart of cool (15° C.) water is added in small portions at 15 minute intervals, with gentle agitation for 5 minutes of each 15 minute period. The liquor is tested for pH before each addition, and the end point is regarded as the point when the pH is permanently depressed below 7.0. In general, this requires about 1.5% of 44% lactic acid, based on the weight of the corium splits. This treatment is effective to neutralize the excess lime in the corium layer and to remove it as a soluble salt. The rate of addition of the lactic acid solution is carefully regulated so that the temperature of the bath is never permitted to rise above about 32° C.

The neutralized and delimed corium splits are then removed from the neutralization bath, drained and rinsed in cool (15° C.) water, packed into polyethylene bags which are in turn placed in 50-gallon fiber drums. Dry Ice in sufficient quantity is placed above and below the polyethylene bags to chill the prepared collagen and to maintain it below 5° C. during storage and/or shipment prior to comminution and acid swelling operations prior to extrusion. It should be noted, however, that the hides may, if desired, be cut into small pieces or small pieces of scrap hide material may be used in the steps of liming, splitting, and neutralization or deliming.

The delimed corium splits are cut into small square or rectangular sections, e.g., ¼ to 4 inches on a side, in preparation for grinding. The small pieces of treated hide are converted to a fine pulp by successive passes through a meat grinder. In this grinding operation, sufficient ice is mixed with the hide splits to maintain the temperature below about 20° C. (and preferably below about 10° C.). Successive passes through the meat grinder use successive smaller dies, the smallest being about ³⁄₆₄ inch. At this point, sufficient water is added to the pulp to produce a mixture consisting of about 90% water and 10% collagen.

The collagen pulp is then treated with sufficient dilute lactic acid (other dilute or weak acids such as citric or acetic acid may be used) to produce a pH of about 2.5–3.7. The acid is usually added as a dilute solution, e.g., about 0.8–2.0%. After thorough mixing, the pulp and acid are stored overnight at a temperature of about 3° C. to swell. At the end of this time the collagen is swollen and has taken up all of the water in the slurry. The swollen collagen is mixed with sufficient water and acid to maintain the pH of 2.5–3.7, thus producing a thin homogenous paste consisting of about 4% collagen and 1.2% lactic acid.

The swollen collagen slurry is passed through a homogenizer to further disperse the fibers and then is filtered to remove any undispersed fiber clumps or other solid contaminants. The paste is generally deaerated by storage under vacuum prior to extrusion. The process, from the washing of the limed hide through the acid swelling of the comminuted collagen, is preferably carried out in a period of about 6–12 hours (and generally no longer than 48 hours).

The homogenized and filtered collagen slurry is then pumped under pressure through the extrusion die as previously described, into a coagulating bath consisting of about 40% ammonium sulfate (sodium sulfate can also be used) in water. When the collagen is extruded as a thin-walled tube into this concentration of ammonium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and to insure proper coagulation of the casing both on the inside and outside.

After film is coagulated in the ammonium sulfate solution, it is necessary to tan the film to give the film sufficient strength for further processing and for stuffing with sausage meat. If the film were taken from the ammonium sulfate coagulating bath and were dried, a film would be produced which has moderate strength in the dry state but which would revert to a paste upon contact with water. It is therefore necessary for the casing to be tanned or hadrened to provide the wet and dry strength in a finished product required in an edible casing.

From the coagulation bath, the casing next passes into a first tanning bath which comprises a solution containing 10–20% of aluminum sulfate, $Al_2(SO_4)_3 \cdot 18H_2O$, 3–7% sodium citrate (or an equivalent amount of citric acid) and 3–7% sodium carbonate. The tanning bath is formulated so that the sodium citrate or citric acid forms a complex with the aluminum sulfate, and the sodium carbonate neutralizes a portion of the aluminum-citrate complex to render the same about one-third to two-thirds basic. This results in a tanning bath having a pH above 3.0 and permits the use of aluminum concentrates for tanning which are many times the concentrations available with other aluminum tanning baths, such as alum tanning baths.

From the first hardening bath or tanning bath, the casing passes through a wash bath, as previously described, in which unreacted tanning or hardening reagent is washed out of the casing. The casing is then passed through a second hardening bath consisting of a 0.15% solution of glutaraldehyde in water. Glutaraldehyde solutions ranging from about 0.01–5.0% concentration may be used, depending upon the residence time of the casing in the solution and the temperature of the treating solution, and the amount of washing to which the casing is subjected.

Following the treatment with glutaraldehyde solution, the casing passes into an additional wash bath (or baths) to wash out unreacted tanning or hardening reagents. The casing is then passed through a plasticizing bath consisting of an aqueous solution of glycerin (or equivalent plasticizer such as sorbitol, dipropylene glycol, triethylene glycol, etc.). The plasticizing bath introduces a substantial amount of the desired plasticizer into the casing, which prevents it from becoming hard and brittle after drying.

From the plasticizing bath, the casing passes through a dryer where it is inflated and dried with the aid of heated air circulated by a fan or blower as described above. Upon leaving the dryer, the casing is partially rehumidified, rolled up on reels, and then shirred on a machine similar to the type used in the shirring of regenerated cellulose casings. Alternatively, the casing may be shirred directly out of the dryer. After the casing is shirred into individual short lengths, it is packaged in suitable cartons. Optionally, the casing may be cured after packaging by heating at about 80° C. in an atmosphere of 20–50% relative humidity for several hours prior to shipment to the meat packer.

The composition of the final product casing is approximately as follows:

|  | Percent |
|---|---|
| Collagen | 74 |
| Glycerin | 14 |
| Water | 9 |
| Aluminum | 2 |
| Fat | 1 |
| Total | 100 |

The several washing steps in this process are effective to remove essentially all of the reagents used in liming the hides in hardening or tanning of the extruded casing, with the exception of a minor amount of calcium (less than about 0.5%) and aluminum (about 2%) which is chemically bound in the collagen. The aldehyde treatments do not leave any residue of free aldehyde. The casing has been analyzed with Shiff's reagent and no free aldehyde is found. The casing has been thermally decomposed and no formaldehyde was found. Also, the casing was hydrolyzed and completely digested with 6 M hydrochloric acid, and steam distilled, and no formaldehyde was found. The casing was analyzed for sulfides and none were found.

Figure 3:
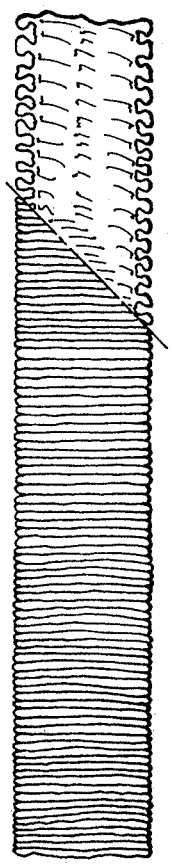
FIG. 3 is extruded edible collagen casing prepared in accordance with this invention as processed in a shirred form.

When this casing was used by the meat packer in a shirred form as illustrated in FIG. 3 and stuffed with sausage meat and formed into links as shown in FIG. 4, a satisfactory sausage product was obtained. The casing was found to function well in stuffing and was formed easily by the linking machine into the desired sausage links. When the sausages were cooked the casing was found to shrink with the meat and to release fat cooked out. There was no excessive tendency of the casing to split during cooking.

Example 2

In this example, frozen steer hides are substituted for fresh cattle hides in the process. The frozen steer hides are thawed and limed as described in the previous example. All other processing steps are as described in Example 1. The casing which is produced is a commercially acceptable casing which is easily handled during processing and shirring, and functions well during stuffing, linking and cooking.

Example 3

A series of experiments were carried out in which the procedure was varied by omitting the second tanning step and/or omitting the trace of aldehyde in the plasticizing bath.

In a series of experiments, the casing was prepared as described in Example 1 except for the omission of the glutaraldehyde tanning step. In these experiments, the casing was passed directly from the wash bath following the aluminum tanning bath to the plasticizing bath and then into the dryer. The casing which was produced was of a strength approximately equal to that obtained in Example 1. The casing shirred well and was packaged and handled by the meat packer easily. The casing was stuffed easily but did not perform satisfactorily in the linker. The elastic properties of the casing did not appear to be adequate to link properly. When the casing was twisted by the linker, it did not take a permanent set and tended to unwind and form long masses of sausage rather than separate links as desired. Several experiments were carried out in the preparation of the casing in which the concentration of aluminum salts in the tanning bath and the residence time of the casing in the tanning bath were varied in an attempt to produce an acceptable casing which could be linked. These experiments were largely unsuccessful. Generally, the casing prepared by use of the aluminum tanning bath alone, without the subsequent treatment with a dilute glutaraldehyde solution, produces a casing which is extremely difficult to link. Even where it was possible to form adequate links in the stuffed casing, the incidence of splitting of the casing during cooking of the sausage links was much higher than was the case for casing which had been given the supplemental glutaraldehyde tanning.

Example 4

The improvement in stuffing, linking and cooking properties obtained by the sequential tanning of collagen casing with aluminum and glutaraldehyde is also obtained when such a tanning process is applied to the treatment of casing prepared from unlimed collagen.

Selected steer hides from carcasses fit for human consumption, weighing about 65–75 lbs. each, are the starting material for this process. As soon as possible after flaying and inspection, the hides are washed in a large volume of circulating cool (10° C.) water to remove adhering blood. After washing, the hides are fleshed fresh without curing to remove adhering fatty or muscular debris from the flaying operation.

The washed and fleshed hides are then treated in dilute acetic acid for several days to partially swell the hide and loosen the hair. After the acetic acid treatment, the hides are split or cut in the plane of the hide into two approximately equal portions by weight. The upper or outer hide surface contains all of the hair, hair follicles, sebaceous and sudorific glands. The inner or corium layer consists substantially of collagen. The outer or hair-containing layer or split is discarded as unsuitable for use in the preparation of casing, but may be used for the formation of leather laminates or coverings.

The corium split is then neutralized in a dilute solution of sodium bicarbonate. The hides are then washed and cut into small sections as described in Example 1. The pieces of corium splits are then converted into a fine pulp by successive passes through a meat grinder. The pulp is treated with lactic acid as described in Example 1, to cause it to swell to prepare a slurry suitable for extrusion. The slurry is then homogenized and filtered and extruded, tanned, plasticized, dried, reeled and shirred, as described in Example 1.

The casing which is obtained in this manner by a two-step, aluminum-glutaraldehyde tanning has improved stuffing, linking and cooking properties as described for the casing produced in accordance with Example 1.

While this invention has been described fully and completely with special emphasis upon several preferred embodiments, it should be understood that within the scope of the appended claims the invention may be practiced otherwise than as specifically described herein.

What is claimed is:

1. In a method of preparing an edible tubular collagen casing which comprises:
    (a) treating a fresh, or frozen, or salt-cured, limed or unlimed, animal hide to remove the flesh, and fatty and muscular debris,
    (b) mechanically splitting the hide to remove the hair and epidermal layer,
    (c) grinding the corium split at a temperature less than about 20° C. to produce a slurry of finely-divided collagen in water,
    (d) treating the slurry with acid at a pH of 2.5–3.7 to swell the collagen,
    (e) extruding the slurry at a collagen content of 2–6% through an annular die into a coagulating bath to form a tubular collagen casing,
    (f) tanning the collagen casing, and
    (g) washing, plasticizing and drying the casing to produce a translucent, non-fibrous, edible product, the improvement which comprises:
    subjecting the coagulated collagen casing to a two-step tanning process, first tanning the collagen casing in a tanning bath of an aluminum sulfate complex at a concentration sufficient to produce an aluminum content of about 1.5–5.0% in the treated casing, and then tanning the casing further in a tanning bath comprising a 0.01–5.0% solution of glutaraldehyde.

2. A method in accordance with claim 1 in which the first tanning bath comprises a solution of an aluminum salt complexed with an organic acid and rendered partially basic by treatment with an alkaline material, said tanning bath having a pH in excess of 3.0.

3. A method in accordance with claim 1 in which the first tanning bath comprises a solution of 10–20% aluminum sulfate, $Al_2(SO_4)_3 \cdot 18H_2O$, 3–7% sodium citrate, and 3–7% sodium carbonate, formulated to produce a one-third to two-thirds basic aluminum sulfate salt complexed with sodium citrate.

References Cited

UNITED STATES PATENTS

| | | | |
|---|---|---|---|
| 2,920,000 | 1/1960 | Hochstadt et al. | |
| 2,971,814 | 2/1961 | Seligsberger. | |
| 3,071,477 | 1/1963 | Klevens | 99—176 |
| 3,123,481 | 3/1964 | Seiler | 99—176 |
| 3,123,482 | 3/1964 | Lieberman | 99—176 |
| 3,194,865 | 7/1965 | Fagan et al. | 99—176 X |

HYMAN LORD, *Primary Examiner.*